United States Patent [19]

Olander et al.

[11] Patent Number: 4,957,756

[45] Date of Patent: Sep. 18, 1990

[54] METHOD FOR PREPARING COOKED OR PRECOOKED BACON

[75] Inventors: John W. Olander, Montague; Coralie George, Stockton, both of Calif.

[73] Assignee: Schreiber Foods, Inc., Green Bay, Wis.

[21] Appl. No.: 350,295

[22] Filed: May 11, 1989

Related U.S. Application Data

[63] Continuation of Ser. No. 99,182, Sep. 21, 1987, abandoned.

[51] Int. Cl.$^5$ .................... A23B 4/01; A23B 4/023; A23L 1/318; A23L 3/01
[52] U.S. Cl. .................... 426/243; 426/266
[58] Field of Search ............ 426/241, 242, 243, 264, 426/266

[56] References Cited

U.S. PATENT DOCUMENTS

| | | | |
|---|---|---|---|
| 2,902,369 | 9/1959 | Komarik | 426/241 |
| 3,192,056 | 6/1965 | Williams | 426/241 X |
| 3,321,314 | 5/1967 | Jeppson | 426/243 |
| 3,532,511 | 10/1970 | Binkerd et al. | 426/243 |
| 3,595,679 | 7/1971 | Schoch et al. | 426/264 |
| 3,674,504 | 7/1972 | Lane | 426/243 |
| 3,868,468 | 2/1975 | Tompkin et al. | 426/243 |
| 3,901,981 | 8/1975 | Draudt | 426/266 |
| 3,906,115 | 9/1975 | Jeppson | 426/243 |
| 4,315,015 | 2/1982 | Theiler | 426/266 |
| 4,315,948 | 2/1982 | Sleeth et al. | 426/266 |
| 4,379,794 | 4/1983 | Theiler | 426/266 |
| 4,411,922 | 10/1983 | Theiler | 426/266 |
| 4,414,232 | 11/1983 | Sleeth et al. | 426/266 |
| 4,435,433 | 3/1984 | Theiler | 426/266 |
| 4,443,483 | 4/1984 | Sato et al. | 426/266 |

OTHER PUBLICATIONS

Robert V. Decareau, *Microwaves in the Food Processing Industry,* Academic Press, Inc., 1985, pp. 131-135.

*Primary Examiner*—Arthur L. Corbin
*Attorney, Agent, or Firm*—Willian Brinks Olds Hofer Gilson & Lione

[57] ABSTRACT

A process for preparing cooked bacon which includes the step of microwave cooking slices of a cured but unsmoked pork belly to produce precooked bacon having the organoleptic properties of precooked conventionally smoked bacon. The conventional smoking step is eliminated.

5 Claims, 1 Drawing Sheet

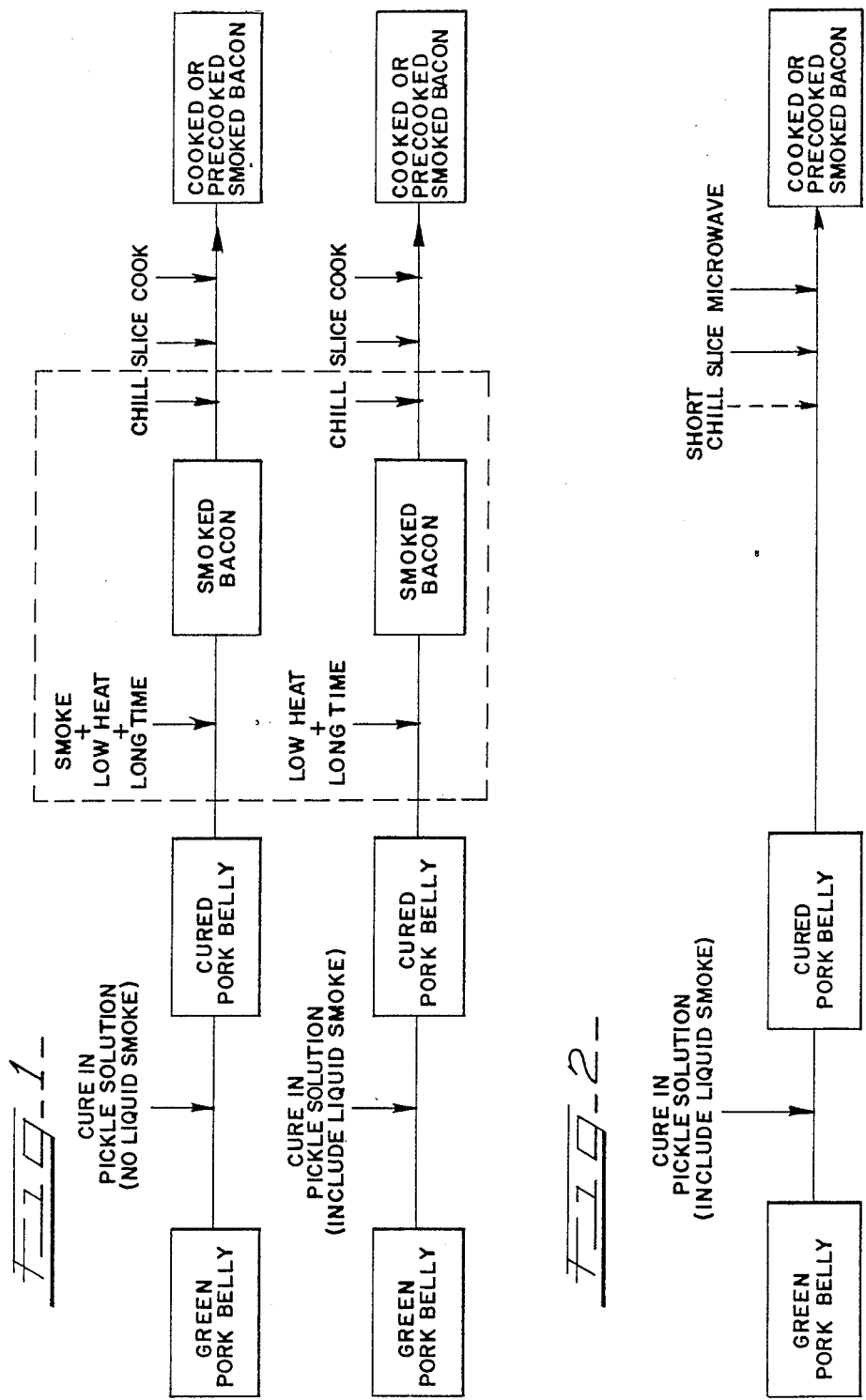

METHOD FOR PREPARING COOKED OR PRECOOKED BACON

This application is a continuation, of application Ser. No. 07/099,182, filed Sept. 21, 1987, now abandoned.

Background of the Invention

This invention relates to a method for preparing cooked or precooked bacon, and more particularly to a method for preparing cooked or precooked bacon using microwave energy. As used herein, the phrase "smoked bacon" refers to a pork belly that has been subjected to the traditional step of smoking at low heat for long periods of time. The term "bacon", on the other hand, refers to a pork belly having the organoleptic properties of smoked bacon, but which may or may not have been subjected to the traditional smoking step. Although the steps of curing and smoking have long contributed significantly to the high cost of smoked bacon, the steps nevertheless continue to be carried out so as to assure the safety of the product and also to impart the characteristic qualities of smoked bacon.

Curing is accomplished by adding salt either alone or in combination with sodium or potassium nitrite to the green (uncured and unsmoked) pork belly and allowing it to disperse throughout the meat. The curing ingredients are commonly incorporated into a brine solution (hereinafter referred to as the "pickle solution") and pumped directly into the green pork belly under pressure to increase the weight of the meat by about 8% to 15% of its green weight. Pumping the pork belly with pickle solution helps the curing agents disperse in the meat more rapidly.

Salt acts by dehydration and altering osmosis to inhibit growth of spoilage bacteria. Nitrate retards development of rancidity and produces the characteristic cured meat flavor. It also reacts with the meat pigments to stabilize the color, and most importantly inhibits the growth of Clostridium botulinum and other spoilage microorganisms. The level of nitrate allowed in curing is limited since excess amounts may react with the natural amines of the meat and produce carcinogenic N-nitrosamines. Polyphosphates are also used to increase the water-binding capacity in cured meats. Sugar and spices are added for flavoring. Curing is generally considered to be complete when the curing ingredients in the pickle solution have diffused through the meat, and the color of the cured meat is fixed to a bright pink color.

Smoking of a whole pork belly is carried out for development of a smoky flavor, additional preservation, development of color, and protection from oxidation. The term "smoking" is defined herein as a process of applying smoke to a pork belly at low heat conditions for a longer period of time. The time period must be sufficient to bring the weight below about 103% of the green weight and at a temperature that does not render fat of the pork belly. Although smoke has traditionally been generated by smoldering wood or sawdust, liquid smoke is now most commonly used. Liquid smoke is prepared by destructive distillation of wood. The particle phase is removed by washing with water, and leaving the vapor phase in solution. Liquid smoke is applied by spraying, dipping, or atomization with heat. Liquid smoke is preferred because it can be applied more uniformly. In addition, the use of liquid smoke avoids the necessity of having to clean equipment, and also avoids the health hazards of environmental pollution from smoke vapor.

Smoke (vapor or liquid) contains chemicals, principally aldehydes, phenols, ketones, and acetic acid. These chemicals are instrumental in killing yeast mold and bacteria, and in retarding future growth. The smoke is deposited on the surface of the meat where it then penetrates the food and distributes the preservative and flavoring elements. Alternatively, the smoke may be injected directly into the meat as an ingredient of the pickle solution, thus accelerating the dispersion of the chemicals contained in the smoke.

Low heat conditions for relatively long periods of time are also considered to be essential for proper traditional smoking of a pork belly. Typically, smoking involves placing the cured pork bellies in heated, smoke-laden currents of air in a smokehouse. Where liquid smoke is used in the pickle solution, proper smoking still requires that the cured pork bellies be heated in a smokehouse at temperatures and for time periods equivalent to those in a smokehouse with smoke vapor. Thus, the term "smoking" also includes the step of heating a liquid smoke permeated pork belly at low heat for long periods of time. Proper smokehouse temperatures for bacon do not render fat, yet are sufficiently high that moisture is drawn off rapidly. Generally, the temperature of a smokehouse for bacon is less than about 160° F. Typically, the internal temperature of the pork belly is between about 126° F. and about 128° F. The smoking step is complete when the moisture content has been stabilized at a level to provide a smoked and chilled weight below about 103% of the green weight. This ordinarily requires minimum periods of time ranging from about 6 to about 8 hours, although smoking for much longer periods of time is not uncommon. The heat accelerates loss of moisture, thereby contributing to the preservation of the meat. Loss of moisture decreases microbial growth, enzyme activity, and deteriorative reactions by removing available water in the product. Smoking generally brings the water activity to less than that of a green belly, typically to between about 0.9 and about 0.95. A completely cured and smoked pork belly has a stable reddish color, and is firm to the touch.

The resulting cured and smoked pork belly is then conventionally chilled and sold as slab bacon, or further processed and sold as sliced bacon. Chilling brings the temperature of the smoked pork belly down from about 128° F. to about 15° F. At 15° F. the bacon not only keeps well, but is also firm enough that it can be sliced in a slicing machine and packaged. Alternatively, slices of the cured and smoked bacon can be partially or fully cooked after the slicing step, and then marketed as precooked or cooked bacon. Bacon is cooked by rapidly applying sufficient energy to render fat. Bacon is generally considered to be precooked when, under cooking conditions, the yield of the bacon is 30%–45% of the raw product. Bacon is cooked when the yield is less than about 45% of the raw product.

As can be readily appreciated, the traditional smoking step described above is expensive. Not only does it require long periods of time, but it also requires costly equipment which consumes large amounts of energy to maintain the elevated temperatures. The prior art has nevertheless considered the step of smoking to be essential in the manufacture of smoked bacon. Subsequent chilling of the finished pork belly as a preparation for slicing and packaging is also an expensive, energy consuming step.

The present invention, as described below, eliminates the problems of the prior art in connection with the manufacture of smoked bacon.

Summary of the Invention

In accordance with one aspect of the present invention, cooked or precooked bacon is prepared which has all the distinctive organoleptic properties of conventionally smoked bacon, but which eliminates the conventional smoking conditions of low heat for long time periods. The method of this invention includes the step of microwave cooking a cured but unsmoked pork belly. Remarkably, even though the conventional smoking step is entirely eliminated, the resulting cooked bacon has the distinctive organoleptic properties of bacon which has been smoked under the traditional conditions of low heat for long time periods.

In accordance with another aspect of the present invention, the pork belly is chilled immediately after the curing step, rather than after the smoking step. Because the curing step takes place at a much lower temperature than smoking, the amount of energy required to chill the pork belly after curing is significantly less than the amount of energy required to chill a pork belly after smoking. Accordingly, additional time and money is saved by reducing the amount of energy required to chill the pork belly.

In accordance with yet another aspect of the present invention, bacon bellies are cured using certain pickle solution formulations which have been found to be particularly microwave efficient, and require less energy to cook the pork belly. Thus the cost of the cooked bacon product is further reduced. Other aspects and advantages of this invention will become apparent to those skilled in the art upon consideration of the following description of the preferred embodiments of the present invention.

Brief Description of the Drawings

FIG. 1 is a schematic diagram of conventional prior art processes for making cooked smoked bacon.

FIG. 2 is a schematic diagram of the process for making cooked or precooked bacon according to the present invention.

Detailed Description of the Invention

It has been discovered that cooked or precooked bacon can be made without the low heat and long time periods associated with the conventional smoking step, yet the bacon surprisingly retains the distinctive organoleptic properties of conventionally smoked bacon. The essence of this invention can be understood more readily upon reference to the schematic diagrams of FIGS. 1 and 2. FIG. 1 shows two different conventional prior art methods of making cooked bacon. The smoking step and chilling step are surrounded by the dotted line.

FIG. 2 shows a schematic diagram of the steps in the method of the present invention. The pork belly can be cured according to methods already known to and practiced by those skilled in the art. The conventional smoking step, which traditionally requires that the bacon be smoked at low heat for a period of time sufficient to reduce the weight of the pork belly to about 103% of its green weight without rendering fat, is eliminated. The chilling step is partially eliminated. Pursuant to this invention, cooked or precooked bacon is prepared by first curing a pork belly. After curing, slices of the cured by unsmoked pork belly are then subjected to sufficient microwave energy in a microwave oven and for a sufficient period of time to cook the slices of cured unsmoked pork belly. Thus, the smoking step, which has traditionally been considered an essential step in the production of bacon, is eliminated. It should be understood that although the unsmoked pork belly of the preferred embodiment of the present invention can be pumped with a pickle solution having liquid smoke, it is not subjected to time and temperature conditions of a smokehouse, and is therefore not considered to be smoked. The result is cooked or precooked bacon having the organoleptic properties of cooked or precooked smoked bacon, but which has not been smoked using traditional methods.

The method generally described above also partially eliminates the chilling step, thus significantly reducing the amount of energy required to chill the pork belly after it has been cured. In the conventional processes shown in FIG. 1, it is necessary that the smoking step bring the internal temperature of the pork belly up to about 128° F. The subsequent chilling step must therefore bring the temperature of the smoked pork belly back down to about 15° F., a temperature difference of about 113° F. In contrast, when the smoking step is eliminated, as shown in FIG. 2, the chilling step immediately follows the curing step, and the temperature need only be brought from the curing temperature of about 50° F. back down to about 18° F., a temperature difference of only 32° F. (compared to the 113° F. difference of the conventional method). Thus, the partial elimination of the conventional chilling step results in a significant cost savings.

In one embodiment, the pickle solution is injected into a bacon belly using well-known techniques, and then held for a sufficient period of time for the pickle to disperse throughout the meat, preferably for a period of time of about 32 to about 48 hours at a temperature ranging from about 48° F. to about 52° F. More preferably, the bacon belly is held for about 40 hours, at a temperature of about 50° F. The bellies are then chilled, preferably to below about 40° F., and sliced, most advantageously onto the belt of a continuous process microwave oven where the slices of the cured pork belly are subjected to microwave energy. The cured pork belly is not smoked prior to cutting into slices. Nor is the pork belly smoked prior to subjecting the pork belly to microwave energy. During the early stages of the microwave cooking step, and prior to the time the belly is finally cooked, the belly returns to near green weight. Pursuant to this method, the conventional smoking step (as well as a portion of the post-smokehouse chilling step) is eliminated.

In the presently preferred method of the present invention, frozen or chilled green pork bellies are first received from a USDA established plant. The bellies are then cut to desired size and tempered or thawed to a temperature of about 35° F. to 40° F. Meat maintained within this temperature range is conducive to good pickle dispersion, and is still considered safe under USDA regulations.

The green pork bellies are then pumped with the pickle. When 100 lbs. of meat is pumped to retain 8% pickle, it most advantageously includes the following:

| | Pounds | Percent |
| --- | --- | --- |
| Meat | 100.0000 | 92.5926 |

-continued

|  | Pounds | Percent |
| --- | --- | --- |
| Water Added | 5.5592 | 5.1474 |
| Salt | 1.8377 | 1.7016 |
| Brown Sugar | .1971 | .1825 |
| Natural Smoke Flavor | .1875 | .1736 |
| Dextrose | .0657 | .0608 |
| Sodium Erythorbate (546 ppm) .0546 | .0506 |  |
| Citric Acid | .0450 | .0417 |
| Soda Ash (Sodium Bicarbonate). | .0433 | .0401 |
| Sodium Nitrite (99 ppm) | .0099 | .0092 |
|  | 108.0000 | 100.0000 |

Unless indicated otherwise, all percentages used herein are weight percentages per 100 lbs. of pumped pork belly, as set forth in column 2 above.

The pork bellies may also advantageously include the following ingredients, when 100 lbs. of meat is pumped to retain 8% pickle:

|  | Percent |
| --- | --- |
| Meat | 92.5926 |
| Water Added | 5.1474 |
| Salt | 1.7016 |
| Brown Sugar | .1500 |
| Natural Smoke Flavor | .1736 |
| Dextrose | .0933 |
| Sodium Erythorbate (546 ppm). | .0506 |
| Citric Acid | .0417 |
| Soda Ash (Sodium Bicarbonate) | .0401 |
| Sodium Nitrite (99 ppm) | .0092 |
|  | 100.0000 |

The resulting bacon pickled with ingredients as described above and cooked according to the preferred method of this invention had a less rich flavor, and a darker color, but was otherwise found to be acceptable.

Another formulation having the same ingredients as above, but with the following exceptions, was also tested:

|  | Percent |
| --- | --- |
| Water | 4.949 |
| Salt | 1.900 |

The resulting cooked bacon was saltier and less sweet tasting. In addition, it was more difficult to dissolve the pickle ingredients. Color retention was also good.

The ranges on the pickle, per 100 lbs. of pumped meat, can be varied generally within the following ranges:
water, from about 5.% to about 6.5%;
salt, from about 1.5% to about 2%;
brown sugar, from about 0.15% to about 0.20%;
liquid smoke, from about 0.15% to about 0.20%;
dextrose, from about 0.05% to about 0.10%;
sodium erythorbate, about 0.05%;
citric acid, from about 0.03% to about 0.05%;
soda ash, from about 0.04% to about 0.05%; and
sodium nitrite, from about 0.008% to about 0.012%.

The lower range on the water is about the minimum amount needed to dissolve the pickle ingredients, while the maximum is selected to avoid unnecessary energy consumption during the microwave oven cooking or precooking step. The amount of salt varies according to taste. The lower range of both sugar ingredients is selected to assure sufficient browning without the smoking step, and the maximum is based on the amount needed to maintain a correct taste profile. The smoke flavor also varies according to taste. The citric acid range will vary depending on the meat, but must generally bring the pH of the finished meat product to about 6.5. The amount of soda ash added will vary depending on the other ingredients and is added principally to buffer the sodium erythorbate. Finally, the amount of sodium erythorbate is determined by the amount needed to stabilize the nitrite.

The pickle described above is mixed with water that is preferably 40° F. or colder, with the mixture being agitated as little as possible, especially without air agitation, in order to avoid loss of the erythorbate or nitrite into the atmosphere.

The pickle solution is then "pumped" (i.e. injected) into the lean side of the green pork belly with a belly pumping machine, such as that made by Townsend Engineering Co. of Des Moines, Iowa, to between about 6.4% and about 9.6%, and preferably about 8% (i.e. 108% of green weight). The injection needles of the Townsend machine should be close together, preferably within about ½" of each other, to assure complete dispersion of the pickle solution in the belly.

In an alternative embodiment, the pickle solution may be pumped into the pork belly absent the liquid smoke, after which the pumped belly is dipped for 3-½ minutes in a liquid smoke bath having about 3 parts water to 1 part liquid smoke.

The pumped bellies are placed in vats and held at a temperature of about 48° F. to about 52° F. or below, preferably about 50° F., for a time period of about 32 to about 48 hours, preferably about 42 hours. Holding at lower temperatures may not result in a belly with a sufficiently low water activity. For example, holding a belly at 34° F. for 48 hours yielded precooked bacon having an unacceptable water activity range of 0.79 to 0.93. Furthermore, it has been found that holding for time periods less than about 32 hours yields precooked bacon having a water activity higher than 0.85, which is generally accepted as the maximum microbiologically safe level of water activity. Holding for time periods greater than about 48 hours, on the other hand, is too long to hold product at 50° F. for good manufacturing practices.

The water activity $a_w$ of precooked bacon is frequently used to determine when a pork belly is sufficiently cured. Water activity is important because it is a measure of the amount of water available to support microbial growth in a food product. Meat products do not behave as ideal solutions due to capillary forces, chemically bound water, and incomplete ion dissociation. Water activity $a_w$ is therefore used to measure the water concentration in the liquid phase (e.g. the ratio of the water vapor pressure of the solution to the vapor pressure of the pure water at the same temperature). The non-ideal behavior of food is thus accounted for. In short, water activity indicates the relative ease with which water could be removed from a product during drying, since $a_w$ is expressed as the relative humidity at which products are in equilibrium with heir environment. A lower $a_w$ generally lowers the susceptibility of food to microbial spoilage. As a general rule, cooked pork belly has a water activity $a_w$ of less than about 0.90, and preferably less than about 0.85. A water activity $a_w$ higher than this (assuming cooking conditions are acceptable) is indicative of an insufficient cure.

The bellies are then chilled in a $CO_2$ tunnel to below about 40° F., preferably to about 18° F. One such tunnel is manufactured by Airco Cryogenics of Murray Hill, N.J. This chilling step stops cure dispersion and inhibits undesirable bacterial growth.

The chilled bellies are then pressed or shaped to uniform size on a bacon press, such as that made by Dohm & Nelke, Inc. of St. Louis, Mo. Uniform size is desirable so that the bellies have the proper dimensions for slicing and packaging. It is also desirable from a standpoint of consumer appeal to have bacon slices of uniform size. If necessary, the bacon bellies may also be trimmed to roughly the desired size prior to or after the shaping step.

The bellies are now ready to be sliced and cooked. It is desirable to slice the bellies directly onto a continuous belt of a microwave oven. A slicer manufactured by J. G. Grote Co., Inc. of Columbus, Ohio, and having model number FG101-2005, has been found especially suitable. Bacon bellies are loaded vertically from the top, and sliced such that individual slices are placed directly onto the continuous conveyor belt of the microwave oven.

The slices of cured pork belly are then carried by the conveyor belt through the microwave oven, where they are subjected to microwave energy and cooked. During the early stages of the microwave process the slices are brought back down to below green weight. As the microwave process continues, the slices reach a pre-cooked or fully-cooked state.

The microwave oven preferably operates on a continuous process. One particular continuous process microwave processing machine found especially suitable for use in the present invention is manufactured by Microdry of San Ramon, Calif., designated as Bacon Cooker 1000# HR. This microwave oven has a counter current furnace which circulates hot air, preferably at a temperature of about 175° F. to 230° F., opposite the direction of the conveyor belt. The primary purpose of the hot air is to remove moisture from the meat and oven to thereby speed up the microwave cooking process. The oven is powered by three 60 kW generators which produce microwaves in the frequency of about 915 MHz. The slices are cooked for a time period of between about 5 to about 15 minutes, preferably from about 6 to about 13 minutes, with a conveyor belt speed of about 8 sec./ft.

The pickle solutions described above have been found to be especially suitable for use in a microwave cooking process. Indeed, pork bellies pumped with these solutions have surprisingly been found to require less energy to cook. For example, in a 180 kW microwave oven, one would normally expect that a pork belly pumped to 8% would require approximately a 7.2% increase in energy (about 16.56 kW) from what would be required to cook a pork belly smoked using conventional methods. Surprisingly, however, it was found that the formulations used in the preferred embodiments of the present invention required only about 5 kW of additional energy, an increase of less than about 3%. Thus, use of the pickle formulations of the present invention require less energy to cook in a microwave oven and result in a significant cost savings.

It should be understood that many conditions vary from one microwave oven to another, which make uniform cooking possible only by a combination of adjustments to power level, conveyor speed, and adjustment of wave guides and match plates to each individual oven. Adjustment of these variables to achieve uniform cooking is deemed to be within the skill of those of ordinary skill in the art.

After cooking, the bacon slices are placed on a heat proof silicon treated piece of parchment and then vacuum packed in a suitable package material.

Although the present invention has been described in connection with presently preferred embodiments, those skilled in the art will recognize many modifications to sequence, arrangement, portions, elements, materials and components which can be used in the practice of the invention without departing from its scope.

I claim:

1. A method of imparting the organoleptic properties of bacon, which has been processed in a smokehouse, to a green pork belly without subjecting the green pork belly to a smokehouse process, the method comprising the steps of:
    injecting pickle solution in a green pork belly to yield an injected green pork belly;
    holding the injected green pork belly at a temperature and for a time period sufficient for said pickle solution to disperse in said injected green pork belly;
    chilling the injected green pork belly;
    after chilling the injected green pork belly, cutting the injected green pork belly into slices;
    after cutting the injected green pork belly into slices subjecting said slices of pork belly to microwave radiation for a sufficient time to at least precook said pork belly such that the weight of said slices is no more than 45% of their green weight.

2. A method of imparting the organoleptic properties of bacon, which has been processed in a smokehouse, to a green pork belly without subjecting the green pork belly to a smokehouse process, the process comprising the steps of:
    pumping a green pork belly with a pickle solution;
    holding the green pork belly with the pickle solution pumped therein for a time period of between about 32 and about 48 hours at a temperature of between about 48° F. and about 52° F. to allow the pickle solution to disperse in the green pork belly to yield a processed green pork belly;
    chilling the processed green pork belly to below about 40° F.;
    pressing the processed green pork belly;
    after chilling and pressing the processed green pork belly, cutting the processed green pork belly into slices; and
    after cutting the processed green pork belly into slices, subjecting said slices of processed green pork belly to microwave radiation for a sufficient time to at least precook said pork belly such that the weight of said slices is no more than 45% of their green weight.

3. A method of imparting the organoleptic properties of bacon, which has been processed in a smokehouse, to a green pork belly without subjecting the green pork belly to a smokehouse process, the method comprising the steps of:
    injecting a pickle solution into a green pork belly;
    holding the green pork belly with the pickle solution injected therein at a temperature and for a time period sufficient for said pickle solution to disperse throughout said pork belly;

slicing said green pork belly with said pickle solution dispersed therein; and after slicing said green pork belly with said pickle solution dispersed therein, subjecting said slices of green pork belly with said pickle solution dispersed therein to microwave radiation for a sufficient time to at least precook said green pork belly with pickle solution dispersed therein such that the weight of said slices is no more than 45% of their green weight.

4. The method of claims 1, 2 or 3, wherein the pork belly is cured with pickle comprising, by weight of 100 lbs. of cured pork belly:
 water, from about 5% to about 6.5%;
 salt, from about 1.5% to about 2%;
 brown sugar, from about 0.15% to about 0.20%;
 liquid smoke, from about 0.15% to about 0.20%;
 dextrose, from about 0.05% to about 0.10%
 sodium erythorbate, about 0.05%;
 citric acid, from about 0.03% to about 0.05%;
 soda ash, from about 0.04% to about 0.05%; and
 sodium nitrite, from about 0.008% to about 0.012%.

5. The method of claims 1, 2 or 3, wherein the pork belly is cured with pickle comprising, by weight of 100 lbs. of cured pork belly:
 water, about 5.1%;
 salt, about 1.7%;
 brown sugar, about 0.18%;
 smoke flavor, about 0.17%;
 dextrose, about 0.06%;
 sodium erythorbate, about 0.05%;
 citric acid, about 0.04%;
 soda ash, about 0.04%; and
 sodium nitrite, about 0.009%.

* * * * *